(12) United States Patent
Sacks et al.

(10) Patent No.: US 6,538,838 B1
(45) Date of Patent: Mar. 25, 2003

(54) METHOD AND APPARATUS FOR CLOSED-LOOP SPIN-STAND TESTING

(75) Inventors: Alexei H. Sacks, Edina, MN (US); James H. McGlennen, Eden Prairie, MN (US); Albert van der Schans, Minnetonka, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/425,808

(22) Filed: Oct. 25, 1999

Related U.S. Application Data (60) Provisional application No. 60/121,144, filed on Feb. 22, 1999.

(51) Int. Cl.[7] .................................................. G11B 5/58
(52) U.S. Cl. .................... 360/77.01; 324/210; 324/212
(58) Field of Search ............................... 324/210, 212; 29/608.03; 360/77.01, 78.12, 31; 318/552, 634

(56) References Cited

U.S. PATENT DOCUMENTS

| | | | |
|---|---|---|---|
| 4,530,019 A | 7/1985 | Penniman | 360/77 |
| 4,811,144 A | 3/1989 | Miller et al. | 360/106 |
| 4,902,971 A | 2/1990 | Guzik et al. | 324/212 |
| 5,189,578 A | 2/1993 | Mori et al. | 360/106 |
| 5,254,946 A | 10/1993 | Guzik | 324/262 |
| 5,382,887 A | 1/1995 | Guzik et al. | 318/652 |
| 5,402,400 A | 3/1995 | Hamada et al. | 369/32 |
| 5,404,492 A * | 4/1995 | Moraaru et al. | 360/31 X |
| 5,465,183 A | 11/1995 | Hattori | 360/78.9 |
| 5,621,178 A | 4/1997 | Van Pelt et al. | 73/862.61 |
| 5,654,841 A | 8/1997 | Hobson et al. | 360/75 |
| 5,793,571 A | 8/1998 | Jurgenson et al. | 360/104 |
| 5,801,531 A | 9/1998 | Viches et al. | 324/212 |
| 5,805,375 A | 9/1998 | Fan et al. | 360/78.12 |
| 5,862,015 A | 1/1999 | Evans et al. | 360/104 |
| 5,872,674 A | 2/1999 | Eddy | 360/78.09 |
| 5,946,158 A | 8/1999 | Nazarian et al. | 360/77.04 |
| 5,998,994 A | 12/1999 | Mori | 324/212 |
| 6,023,145 A * | 2/2000 | Karaaslan et al. | 318/652 |
| 6,025,988 A * | 2/2000 | Yan | 361/685 |
| 6,078,476 A | 6/2000 | Magee et al. | 360/106 |
| 6,088,181 A | 7/2000 | Tanaka | 360/66 |

OTHER PUBLICATIONS

U.S. patent application Ser. No. 09/426,349, Sacks et al., filed Oct. 25, 1999.

* cited by examiner

*Primary Examiner*—Regina N. Holder
(74) *Attorney, Agent, or Firm*—Theodore M. Magee; Westman, Champlin & Kelly, P.A.

(57) ABSTRACT

A method and apparatus are provided for testing a head to be used in a disc drive. The method is performed in a spin-stand and includes steps of positioning a head over a radial position on a disc, reading test data from a track at the radial position, reading servo data from the track, and using the servo data to position the head at a desired location within the track. The apparatus for practicing this method includes a disc capable of spinning, a positioning system capable of establishing a position for a head relative to the disc, a servo circuit capable of converting a servo signal into a position value, and a feedback circuit capable of controlling the positioning system based on the position value.

19 Claims, 11 Drawing Sheets

METHOD AND APPARATUS FOR CLOSED-LOOP SPIN-STAND TESTING

REFERENCE TO RELATED APPLICATIONS

The present application claims priority from a U.S. Provisional Patent Application having Ser. No. 60/121,144 filed on Feb. 22, 1999 and entitled READ/WRITE TEST ENHANCEMENT USING TEST PART'S MICROACTUATOR.

The present application is also related to a U.S. patent application Ser. No. 08/426,349 filed on even date herewith, owned by a common Assignee, entitled METHOD AND APPARATUS FOR TESTING MICROACTUATORS ON A SUSPENSION ASSEMBLY.

FIELD OF THE INVENTION

The present invention is related to disc drive testing. In particular, the present invention is related to spin-stand testing.

BACKGROUND OF THE INVENTION

In a computer disc drive, data is stored on a computer disc in concentric tracks. In many drives, the data is stored using a write head that changes a physical property of the disc. The data is read from the disc by positioning a read head over a desired track and sensing the physical properties of the disc along the track. For example, in a magnetic disc drive, the read head senses magnetic moment boundaries along the disc.

The process for producing a read head or a write head varies depending on the type of read head or write head being produced. Nonetheless, all head manufacturing methods share common characteristics, such as a high degree of manufacturing complexity, small feature sizes, and a susceptibility to manufacturing errors. Because of this, each production method generates a significant number of heads that do not meet specifications.

In order to detect faulty heads accurately, the heads must be tested over a disc surface. In particular, each head must be flown over a disc surface while it performs writing and/or reading operations. Early in the disc drive manufacturing art, this type of testing was performed after the head was assembled in a complete disc drive. However, this proved to be unacceptable because the disc drive had to be rebuilt if the head was found to be faulty.

To overcome the inefficiencies of in-drive testing, the art developed a "spin-stand", which allowed the head to be tested before it was placed in a disc drive. In general, a spin-stand includes a spinning disc and a mounting support that supports the head and moves the head to a desired position over the spinning disc. In spin-stands of the prior art, the movement of the head is controlled by two coarse motors that move the head respectively in the "Y" direction and the "X" direction, where movement in the "Y" direction changes the skew angle between the head and the track and movement in the "X" direction changes the radial location of the head over the disc. Most spin-stands include an additional "X" coordinate motor for fine positioning. In general, the fine positioning "X" coordinate motor is a piezo element that is capable of moving the head in steps less than 10 nanometers long. For many heads, this movement is on the order of $\frac{1}{100}$ of the width of the head.

During testing, the fine positioning piezo element is used to position a read head at different locations across a data track. A series of tests are then performed on the read head including, for example, error-rate testing, pulse width-fifty testing, track average amplitude. (TAA) testing, and track scan testing.

Under one system of the prior art, the head is positioned using an open-loop servo system that does not measure the position of the head relative to the disc. Instead, the open-loop system passes control signals to the piezo element and calculates the position of the head based how the piezo element is expected to react to those signals. Other spin-stands use closed-loop servo systems to keep the head at a desired position relative to external visible guides. These closed-loop systems measure the position of the head using sensors external to the head and then apply a feedback signal to the servo elements to move the head to a desired position. Note that these closed-loop systems are unable to determine the position of the head relative to a written track on the disc. They are only able to determine the position of the head relative to the visible guides.

In the past, open-loop positioning systems or closed-loop positioning systems with external sensors were sufficient for spin-stand testing because the spin-stand was stable enough to maintain the head in a relatively small area of a track. Thus, testing could be performed on the head without being concerned that the head was moving outside of a desired track location.

With each new generation of disc drives, the density of tracks on the disc has increased causing a corresponding decrease in the width of the read and write heads. Because of this, positioning a head within a track, even on a spin-stand, has become increasingly difficult. To overcome this problem, the art has attempted to make the spin-stand more stable so that the head is less likely to move relative to a track. Although this has improved head stability, it has limited the positioning speed of the spin-stand.

SUMMARY OF THE INVENTION

A method and apparatus are provided for testing a head to be used in a disc drive. The method is performed in a spin-stand and includes steps of positioning a head over a radial position on a disc, reading test data from a track at the radial position, reading servo data from the track, and using the servo data to position the head at a desired location within the track. The apparatus for practicing this method includes a disc capable of spinning, a positioning system capable of establishing a position for a head relative to the disc, a servo circuit capable of converting a servo signal into a position value, and a feedback circuit capable of controlling the positioning system based on the position value.

DETAILED DESCRIPTION OF ILLUSTRATIVE EMBODIMENTS

Figure 1:
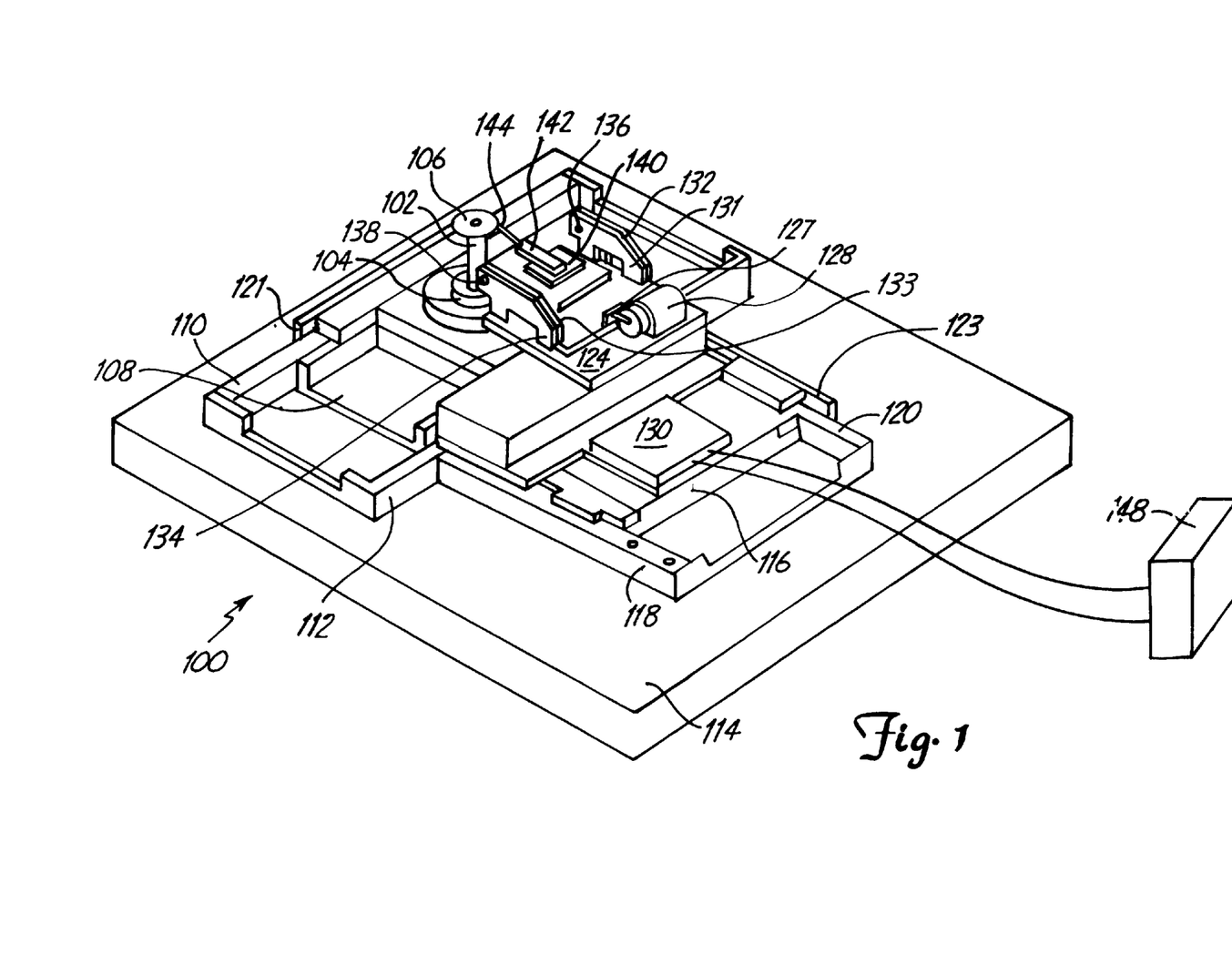
FIG. 1 is a perspective view of a spin-stand of the present invention.
Figure 2:
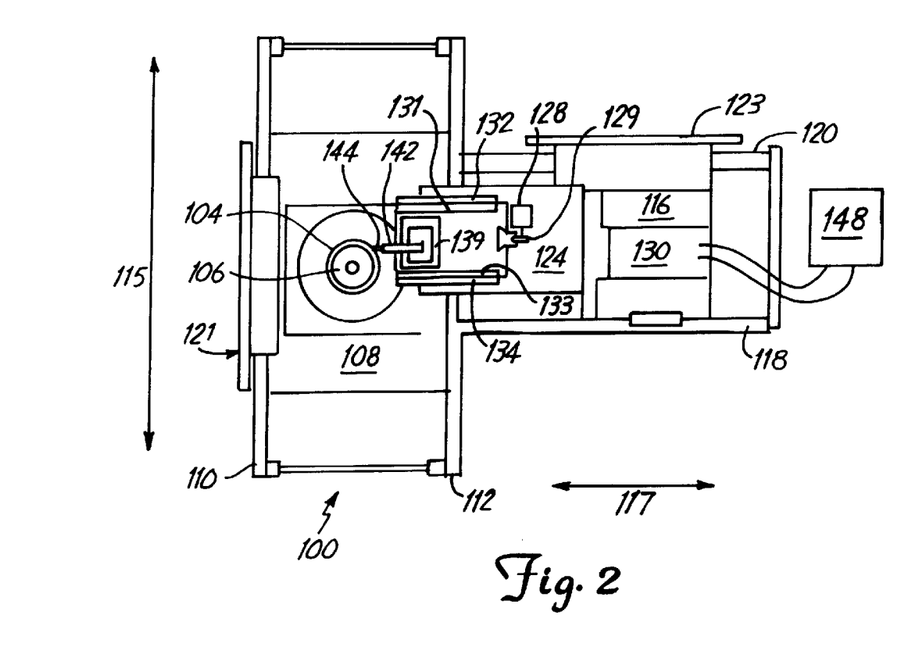
FIG. 2 is a top view of the spin-stand of FIG. 1.
Figure 3:
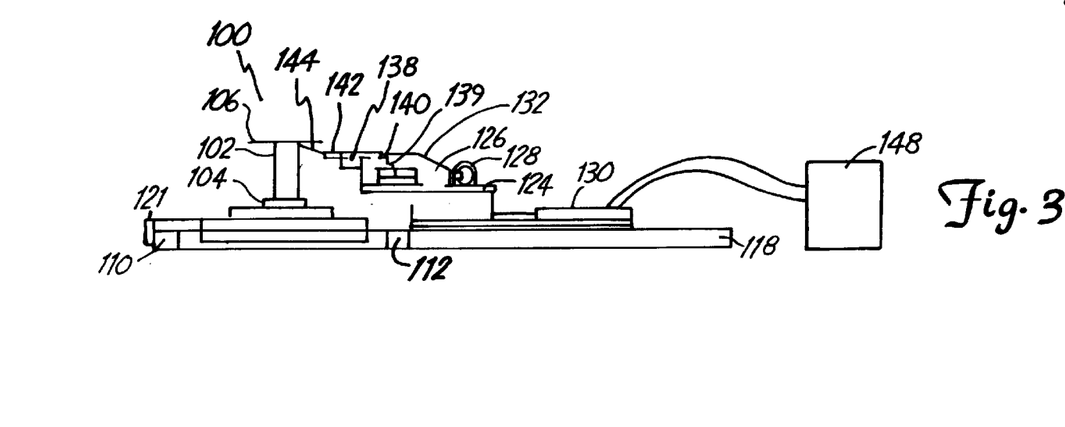
FIG. 3 is a side view of the spin-stand of FIG. 1.

FIGS. 1, 2, and 3 are perspective, top, and side views, respectively, of a spin-stand 100 of the present invention. Spin-stand 100 includes a disc 106 mounted on a spindle 102, which is rotated by spindle motor 104. Spindle motor 104 rests on a platform 108 that moves between two guide rails 110 and 112. In one embodiment, platform 108 is supported by a cushion of air during movement and is stabilized in a particular position by the application of a vacuum between platform 108 and a granite face 114 directly below platform 108. For purposes of reference, movement of platform 108 along guides 110 and 112 is considered to be in the "X" direction as shown by arrows 115 of FIG. 2. A position encoder 121 is located along guide 110 to provide an indication of the position of platform 108.

Spin-stand 100 also includes a carriage 116 that moves between rails 118 and 120 in the Y direction shown by arrows 117. Like platform 108, carriage 116 is supported by a cushion of air during movement and is locked into position by applying a vacuum between carriage 116 and granite base 114. A position encoder 123 is located along guide 120 to provide an indication of the position of platform 116.

In one embodiment, carriage 116 and platform 108 both move using electromotive motors mounted between one of the guide rails and the respective platform or carriage. Other types of motors, such as a stepper motor for example, may be used in place of the electromotive motors.

Carriage 116 supports a printed circuit board 130 and a support platform 124. Support platform 124 includes a pair of support brackets 132, 134 that are connected by respective pivot pins 136 and 138 to a pair of support brackets 131, 133 on a pivoting platform 126. Through support brackets 131, 132, 133, and 134, support platform 124 supports pivoting platform 126 so that it may pivot about pivot pins 136 and 138. Support platform 124 also supports a pivot motor 128, which has an eccentric cam 129 that is in contact with a lever arm 127 on pivoting platform 126.

Pivoting platform 126 supports a mounting platform 139 that provides a base for a piezo platform 140. Piezo platform 140 is connected to a suspension chuck 142 that holds a disc drive suspension 144 as shown in more detail below. Piezo platform 140 is connected to suspension chuck 142 through piezo elements that are able to move suspension chuck 142 in the "X" direction as shown by arrows 115. The piezo elements of piezo platform 140 are able to move suspension chuck 142 by distances of less than nanometers in response to electrical signals received from a control circuit.

During head loading operations, pivot motor 128 rotates eccentric cam 129 causing lever arm 127 and the back end of pivoting platform 126 to rotate upward about pivot pins 138 and 136. Suspension chuck 142, which carries suspension 144, is then placed on piezo platform 140 and spindle motor 104 is activated so that disc 106 rotates at a desired speed. With the suspension loaded, carriage 116 is moved forward so that a head at the end of suspension 144 moves under disc 106. Support platform 108 is also moved so that the head is positioned at a desired radius along disc 106. When the head nears the desired disc location, motor 128 rotates eccentric cam 129 back so that pivoting platform 126 returns to its level position and the head is brought into proximity with disc 106. The head on suspension 144 then flies over the surface of disc 106.

The head on suspension 144 is connected by electrical leads to printed circuit 130, which has further connections to a test box 148. Test box 148 controls the types of tests performed on the head. In particular, test box 148 designates the location for the test track, the data to be written to the disc, and the position of the read head within the written track during read back of the test data. Using the piezo elements of piezo platform 140, the read head can be moved to a number of different locations within a track during read back, so that the profile of the read head can be determined.

The elements of the spin-stand described above are common to the present invention and to prior art spin-stands. The inventive aspect of the present invention is the use of microactuators within suspension 144 to perform a closed-loop track following operation. Prior art spin-stands are unable to perform such track following because the piezo elements and the other positioning actuators in the spin-stands do not have the frequency response necessary to follow a track written to a disc.

Figure 4:
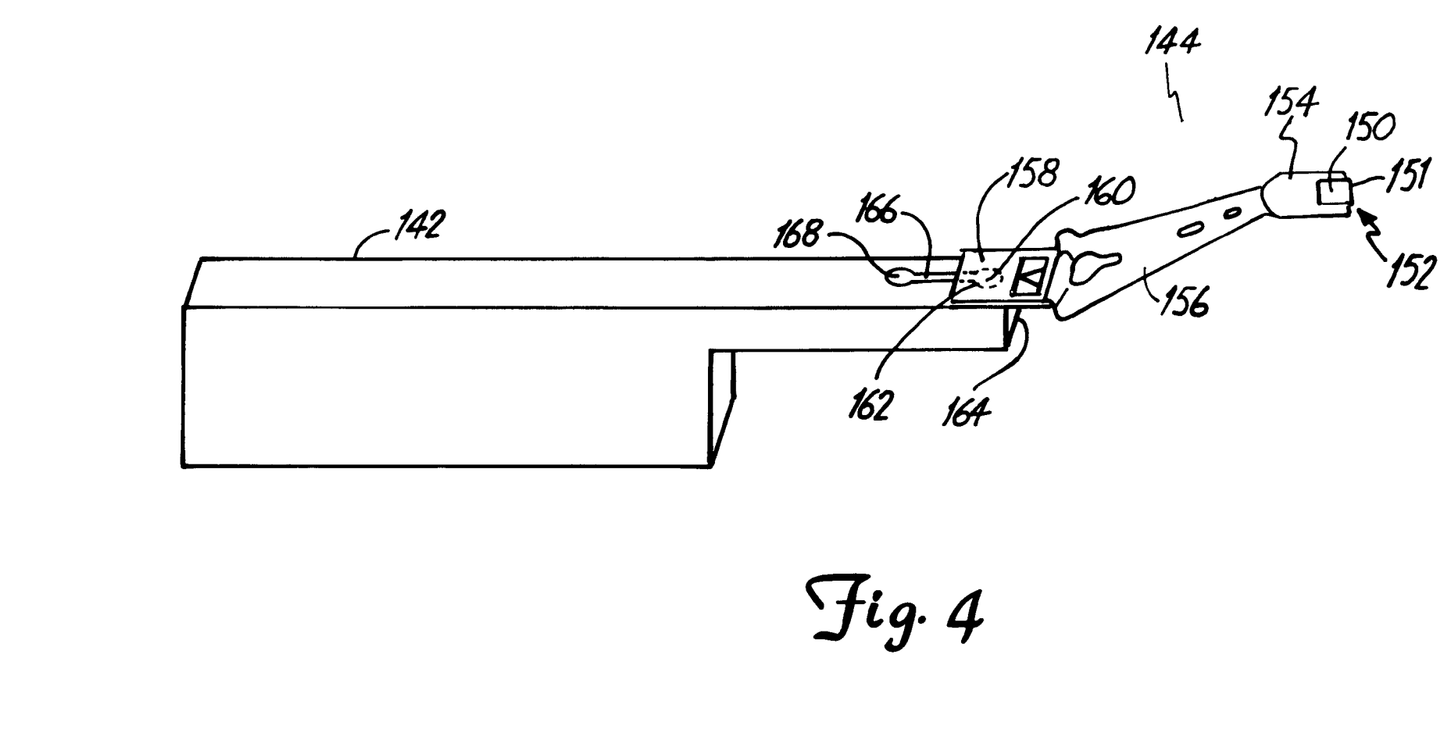
FIG. 4 is a perspective view of a suspension chuck and a suspension under an embodiment of the present invention.

FIG. 4 provides a more detailed perspective view of suspension chuck 142 and suspension 144. Suspension 144 includes a gimble 154 that is connected to a slider 150 containing one or more heads 151 on a trailing edge 152. Suspension 144 also includes a flexure arm 156 and a base plate 158. Base plate 158 includes a boss 160 that extends into suspension chuck 142 through a hole 162. Hole 162 is in communication with a channel 164 and a second channel 166. Channel 164 extends to the end of suspension chuck 142 and channel 166 extends to spreader hole 168. By inserting a pin in spreader hole 168, hole 162 can be widened so that boss 160 can be inserted into the hole. When the pin is removed from hole 168, hole 162 becomes smaller causing suspension chuck 142 to grasp boss 160.

Figure 5:
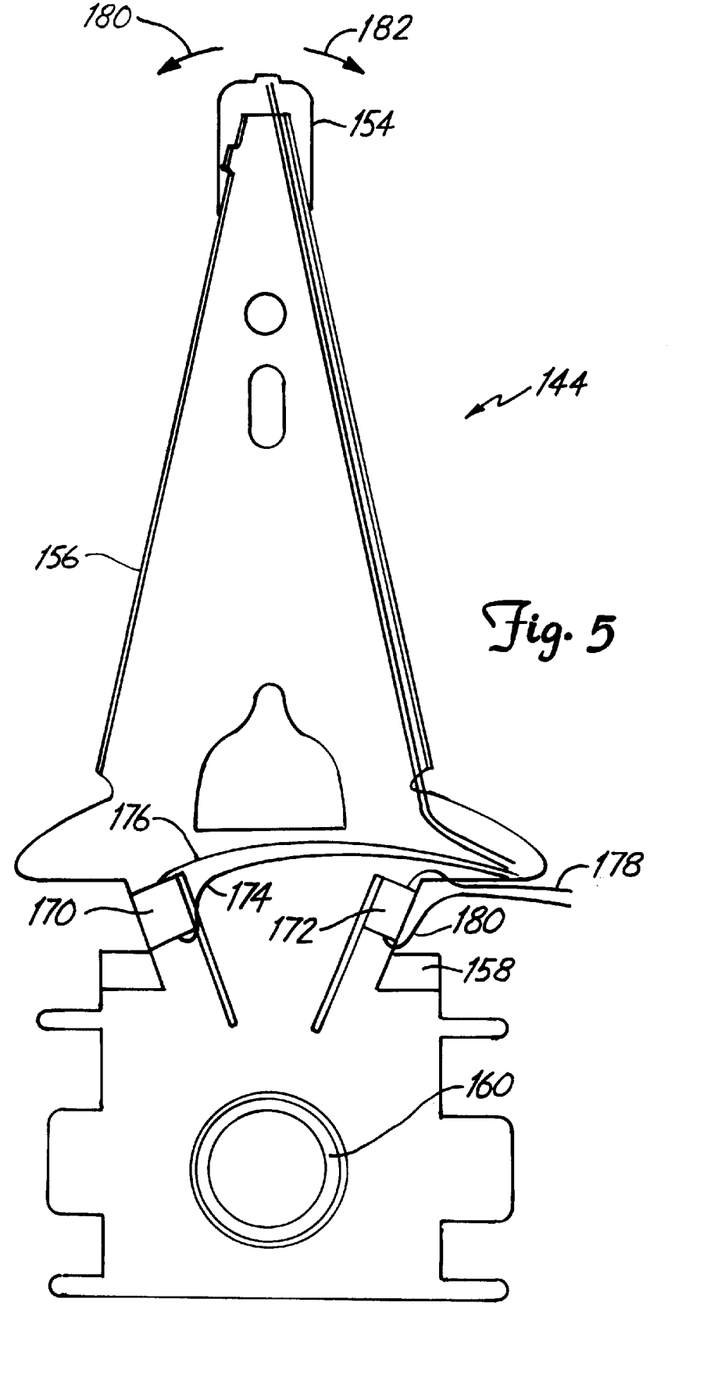
FIG. 5 is a top view of a suspension with a microactuator.

FIG. 5 provides a top view of suspension 144. In FIG. 5, flexure arm 156 includes two microactuators 170 and 172. In one embodiment, microactuators 170 and 172 are capable of contracting or expanding depending on a voltage applied by respective conducting lines 174, 176 and 178, 180. In one embodiment, microactuator 170 is contracted while microactuator 172 is expanded so that the end of suspension 144 moves in a direction 180. At other times, microactuator 172 is contracted while microactuator 170 is expanded to move the end of suspension 144 in a direction 182. The movement of the microactuators can be controlled by a circuit either in circuit board 130 or in test box 148 of FIGS. 1, 2 and 3.

The present invention is not limited to the particular location and type of microactuators shown in FIG. 5. In fact, microactuators may be present in many different configurations along suspension 144. In particular, microactuators may exist between flexure arm 156 and gimble 154, along slider 150 and between slider 150 and head 152. In addition, multiple microactuators may be used within the same suspension assembly with their movement coordinated by a circuit on circuit board 130 or in test box 148.

Figure 6:
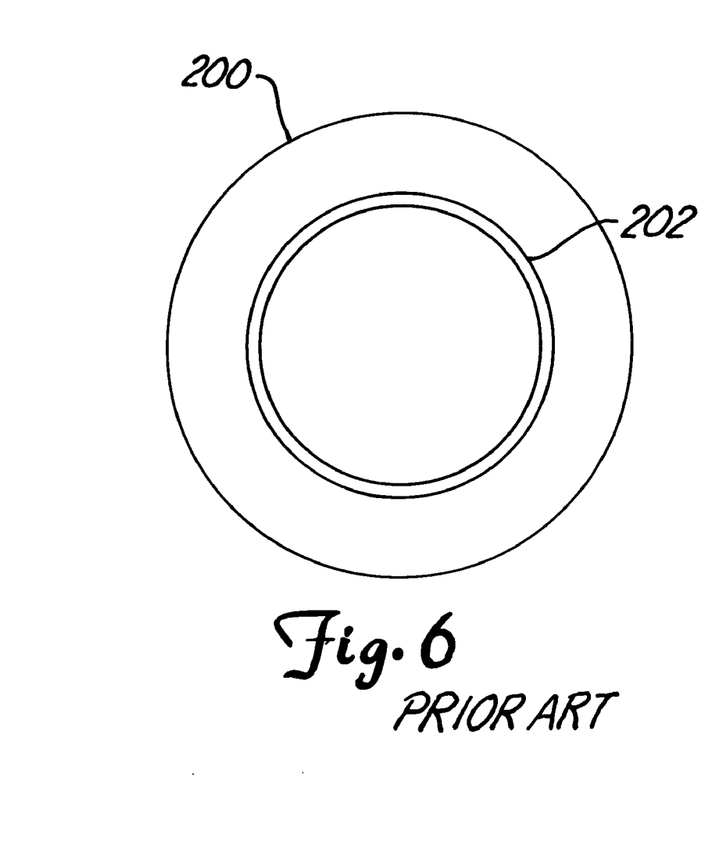
FIG. 6 is a top view of a disc of the prior art.

As mentioned above, prior art spin-stands do not use track following to position the head over a track. As such, test tracks of the prior art do not include servo regions. An example of a disc with a test track of the prior art is shown in FIG. 6 where disc 200 includes a written track 202 that does not include servo regions. Instead, written track 202 includes only test data.

Under the present invention, the head in the spin-stand is positioned using a closed-loop servo system that utilizes track following. As such, the test track includes servo regions written onto the disc at various circumferential locations. An example of such a disc 204 is shown in FIG. 7, and includes a circumferential track 206 having data areas such as data areas 208, 210, and 212 that are interspersed with servo areas such as servo areas 213, 214, 216 and 218.

Figure 7:
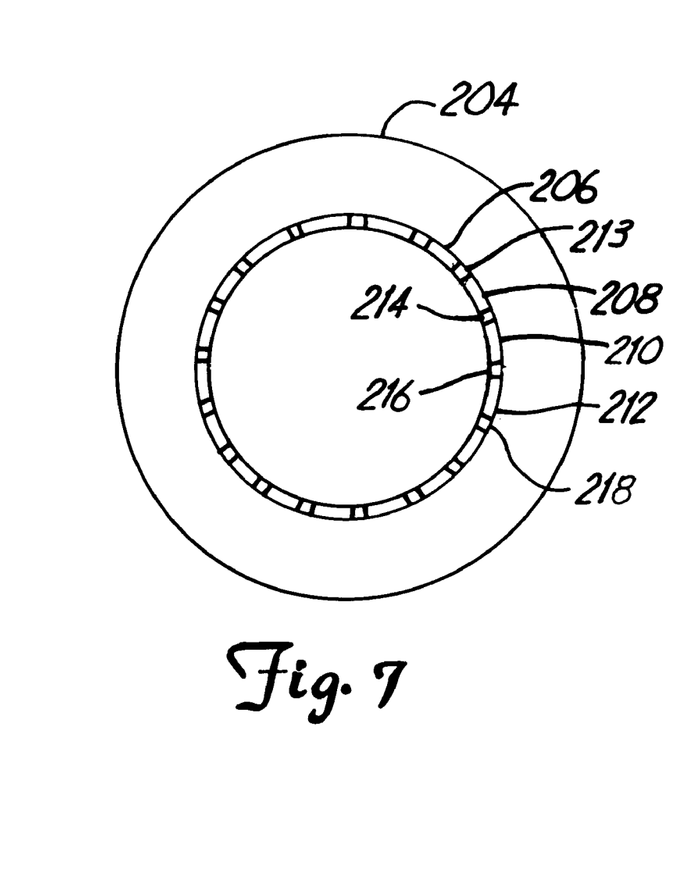
FIG. 7 is a top view of a disc under an embodiment of the present invention.
Figures 8, 9:
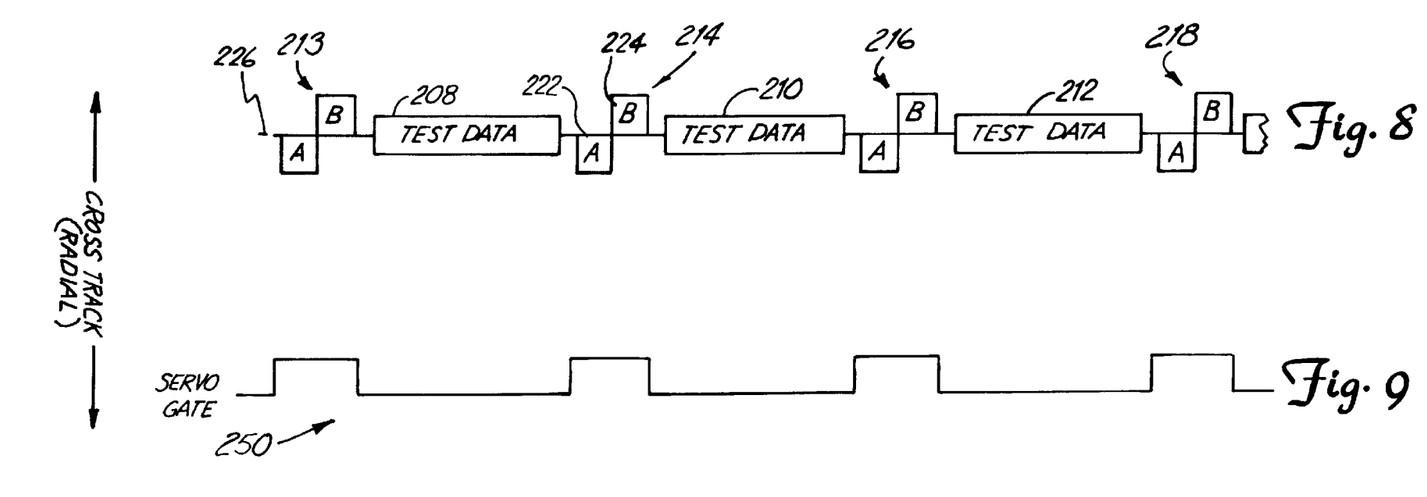
FIG. 8 is a more detailed view of a test track under an embodiment of the present invention.
FIG. 9 is a timing diagram showing servo gate timing.

FIG. 8 shows a more detailed view of one embodiment of track 206 of FIG. 7, showing servo areas 213, 214, 216, and 218 and test data areas 208, 210, and 212. In FIG. 8, the cross track or radial direction is shown vertically and the down track direction or time is shown horizontally. Each servo region consists of an "A" burst and a "B" burst such as "A" burst 222 and "B" burst 224 of servo region 214. "A" burst 222 and "B" burst 224 are radially offset from each other such that they share a common border along track center 226 of the test track. The test data written in test data regions 208, 210, and 212 is preferably written so that it is centered on track center line 226.

Since prior art systems do not include a servo region, the read and write channels do not have to be concerned with handling both test data and servo data. However, under the present invention, the read and write channel must accommodate both servo data and test data. To accomplish this, the present invention utilizes two gating signals. The first gating signal is a servo gating signal 250 shown in FIG. 9, which is high during servo regions 213, 214, 216 and 218 and is low at all other times. The second gating signal is a read/write gating signal 252 shown in FIG. 10, which is high during test data regions 208, 210, and 212 and is low at all other times. For clarity, FIG. 9 and are aligned with FIG. 8 to show the alignment between the gating signals and the position of the read/write head during those gating signals.

Figure 10:
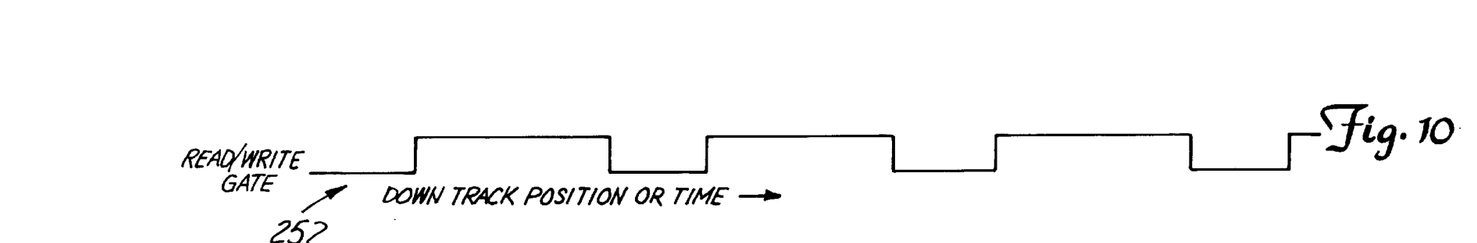
FIG. 10 is a timing diagram showing test data read/write gate timing.

In one embodiment, servo gating signal 250 and read/write gating signal 252 are generated based on a once-around index read from the spindle of the spin-stand. In particular, a position encoder located on the spindle indicates the index's position. Because of limitations of the position encoder, the timing between the index signal and the actual index position can vary ±100 nsec. To accommodate this jitter, the transitions of servo gating signal 250 and read/write gating signal 252 are not aligned with each other. Instead, a small period of time passes between when read/write gating signal 252 has a transition and when servo gating signal 250 has a transition. This time period provides a tolerance to the index jitter and helps to ensure that test data does not write over servo data on the disc.

Figure 11:
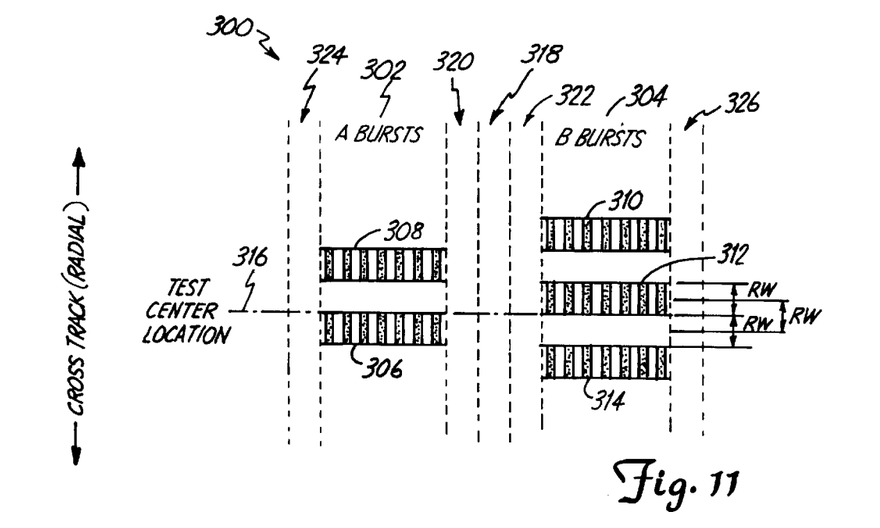
FIG. 11 is a more detailed diagram of a servo region under one embodiment of the present invention.

FIG. 11 shows a more detailed layout of a servo region 300 for an embodiment of the present invention. Servo region 300 includes "A" burst region 302 and "B" burst region 304. "A" burst region 302 includes two radially offset bursts 306 and 308, where each burst includes a series of magnetic moment transitions that occur at a fixed frequency. In FIG. 11, dark shaded areas in bursts 306 and 308 indicate areas that have magnet moments that point to the right side of the page and white areas in bursts 306 and 308 indicate areas with magnetic moments that point to the left side of the page. Bursts 306 and 308 are radially separated from each other by a track width, which in one embodiment is the width of the read/write head being tested. In addition, each burst has a radial width equal to the track width. Although such widths are preferred, those skilled in the art will recognize that bursts 306 and 308 can have different widths and can be separated by different distances.

"B" burst region 304 includes three bursts 310, 312, and 314 that each have a series of magnetic transitions which occur at a fixed frequency. Each of the "B" bursts has the same width and is radially separated from other "B" bursts by a distance equal to the track width.

The bursts of "A" burst region 302 are radially offset from the bursts of "B" burst region 304 such that "A" burst 306 and "B" burst 312 each have an edge running along a track center line 316, but "A" burst 306 is radially inside track center line 316 and "B" burst 312 is radially outside track center line 316.

"A" burst region 302 and "B" burst region 304 are separated circumferentially by an isolation area 318 and two tolerance regions 320 and 322. Isolation area 318 is the normal separation distance between burst regions found in most servo systems in most disc drives. Tolerance areas 320 and 322 are added under the present invention because of the variations introduced into the servo tracking system due to the jitter of the index hardware. In particular, the spindle encoder introduces timing variations that may cause burst regions to overwrite each other unless tolerances such as tolerance areas 320 and 322 are written into the servo areas. In addition to tolerance areas 320 and 322, there is a leading tolerance area 324 before "A" burst region 302 and a trailing tolerance area 326 after "B" burst region 304.

Figure 12:
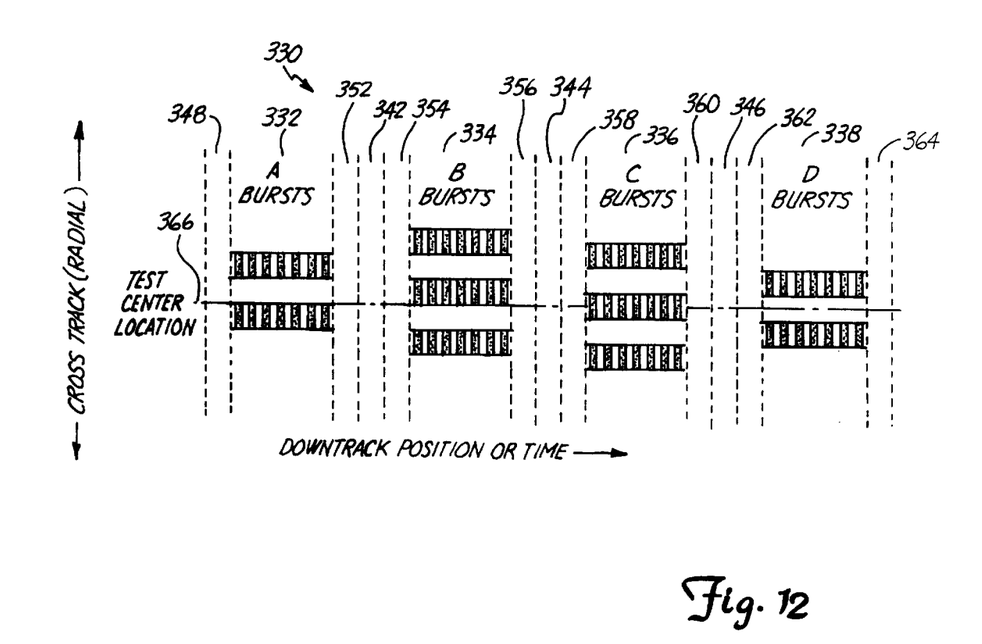
FIG. 12 is a more detailed diagram of a servo region under an alternative embodiment of the present invention.

FIG. 12 shows a layout for a servo region 330 representing a second embodiment of a servo region of the present invention. In servo region 330, "A" burst region 332 and "B" burst region 334 provide a normal contribution to the servo signal and "C" burst region 336 and "D" burst region 338 provide a quadrature portion of the servo signal. The servo bursts of "C" burst region 336 are radially offset by one-half of a track width from the bursts of "B" burst region 334 so that servo burst 340 of "C" burst region 336 is centered on track center line 366. The servo bursts of "D" burst region 338 are radially offset from the bursts of "C" burst region 336 by one track width. Servo region 300 includes isolation regions 342, 344 and 346 and tolerance areas 348, 352, 354, 356, 358, 360, 362, and 364, which are similar to the isolation regions and tolerance areas described above for FIG. 11.

For the servo layout of FIG. 11, a single position error signal is generated to identify the offset of the head with respect to the center of the track. In one embodiment, this position error signal is formed mathematically as:

$$PES = \frac{A - B}{A + B} \qquad \text{EQ. 1}$$

Where "A" and "B" are the amplitude estimates of the read signal generated from the "A" and "B" burst regions respectively. The normalization of the difference of the two amplitudes by the sum of the two amplitudes is preferable, but not necessary. Methods of demodulating servo patterns to obtain their amplitude estimates are well known. For example, U.S. Pat. No. 4,530,019 entitled "SERVO PATTERNS" contains a description of one such implementation.

For the servo layout of FIG. 12, an additional position error signal can be calculated as:

$$PES = \frac{C-D}{C+D} \qquad \text{EQ. 2}$$

Where "C" and "D" are the amplitude estimates of the read signal generated from the "C" and "D" burst regions respectively. This position error signal is known as a quadrature position error signal, while the position error signal of Equation 1 is referred to as the normal position error signal. Methods of combining these two position error signal estimates are well known. In one simple method, the servo system commutates between the two position error signal estimates to stay in the most linear region of each while moving in the cross track direction.

There are multiple ways of forming the amplitude estimates of the "A", "B", "C" and "D" burst regions. Common to all methods, however, is the formation of demodulation timing signals that indicate when to look for the respective bursts. These timing signals are formed by test electronics under the present invention, which use the spindle index as a reference. As discussed above, this spindle index can jitter by as much as ±100 nsec from revolution to revolution. Therefore, to ensure that the entire burst is demodulated, the timing signals generated by the test electronics are generally made long enough so that if the timing signal were centered on a burst, the high portion of the timing signal would encompass the tolerance areas before and after the burst. For example, a timing signal for demodulating "A" burst 308 of FIG. 11 would be long enough to encompass tolerance area 324, "A" burst 308, and tolerance area 320.

Amplitude estimates of the respective bursts can be formed in several different ways. Under one embodiment of the present invention, asynchronous methods of detection are used, such as peak detection with a qualifier threshold, or root-mean square detection to provide an average estimate of the signal. These types of circuits are standard and well known.

Figure 13:
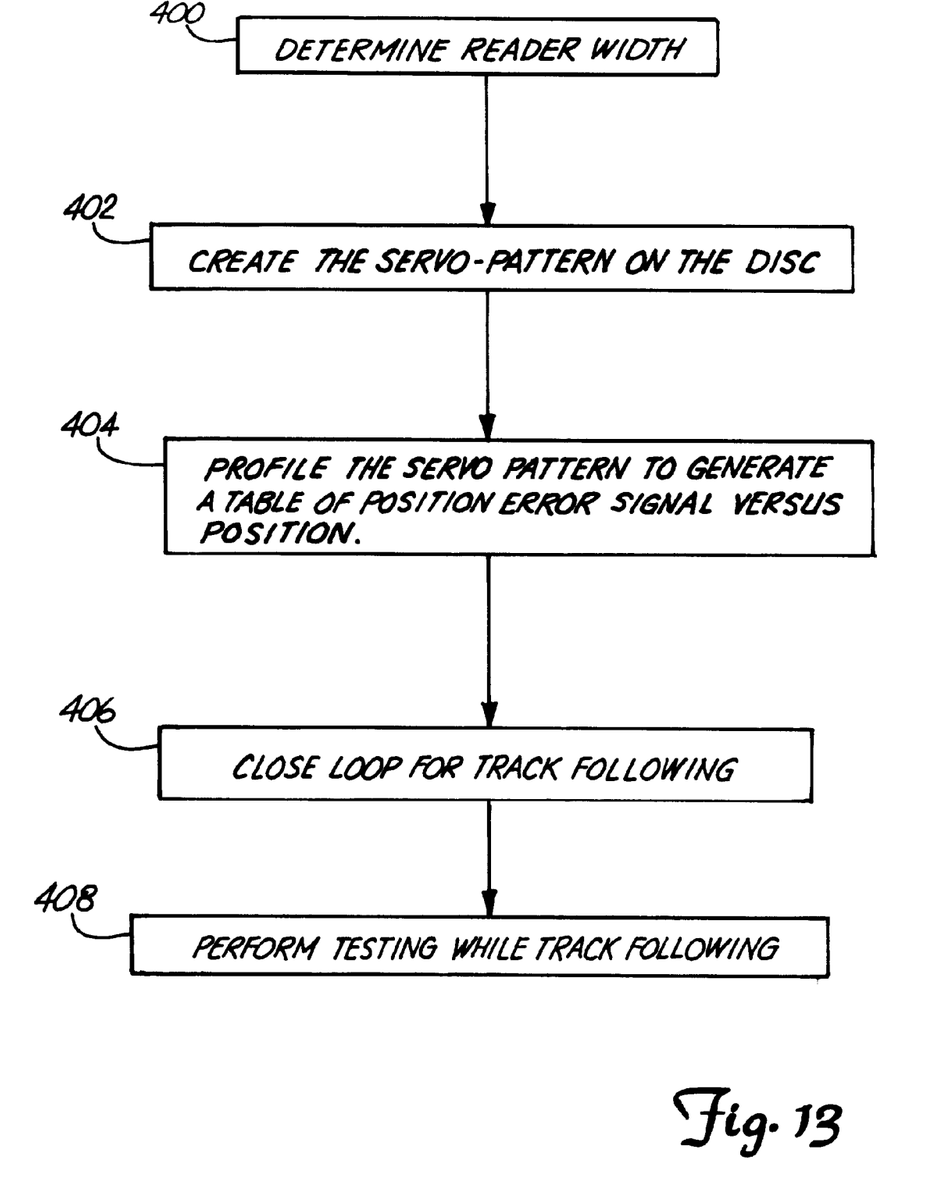
FIG. 13 is a flow diagram for initializing a spin-stand under the present invention.

FIG. 13 provides a flow diagram for initializing the spin-stand for testing under one embodiment of the present invention. At step 400 of FIG. 13, the width of the read head is determined so that it can be used to define the track pitch at which data will be written to the disc. By matching the track width to the reader width, this embodiment of the invention produces a more linear position error signal. In particular, this width matching helps to prevent the position error signal from having regions of non-zero gain, which make position estimation difficult. The reader width can be determined using a number of different methods. In one embodiment, a broad track is written to the disc and then the read head is moved radially across the full track. By measuring the change in the amplitude of the read signal as the read head is moved radially across the track, the width of the read head can be determined. Such a full track scan can be implemented using the piezo element of the spin-stand and does not require the activation of any of the microactuators on the suspension.

Alternatively, a very thin track can be written to the disc and a microtrack profile can be taken to estimate the electrical reader width. Such microtrack profiles are well known in the art and are generally generated by radially moving the read head across the track and recording where the read head generates a read signal.

Once the reader width has been determined, the initialization process continues at step 402 where a servo pattern is written to the disc. Under one embodiment, the servo pattern is generated by moving a write head to a test radius, offsetting the head by one-half of the reader width, and writing a series of "A" bursts at selected locations around the disc. The write head is then radially offset away from the spindle by an additional reader width and "B" bursts are written circumferentially around the disc at designated servo areas. The circumferential location of the "A" and "B" bursts around the disc is controlled in part by the index on the spindle read by the test circuitry.

A second set of "B" bursts is then written to the disc by moving the write head so that it is offset from the track centerline toward the spindle by one-half of a reader width. Once the second set of "B" bursts has been written, a second set of "A" bursts can be written by moving the write head an additional reader width toward the spindle.

In many embodiments, the two sets of "A" and "B" bursts described above should be sufficient to perform track following. However, for extremely narrow track widths, additional sets of bursts may be needed. It is noted that as a general rule, one set of bursts should be written beyond the furthest expected extent of motion of the head so that the last servo null has a trimmed track on the outer side of the pattern.

Once the servo patterns have been written to the disc at step 402, the process of FIG. 13 continues at step 404 where the servo regions are profiled to generate a table that relates position error signals to actual positions over the disc. Under one embodiment, this step is accomplished using the fine positioning mechanism of the spin-stand. In particular, a controller in test box 148 or circuit board 130 generates a series of position values that represents desired positions for the head. Based on these values, piezo element 140 steps the head radially through the servo bursts. At each step, the position value and the value of the position error signal are stored in a table.

Figure 14:
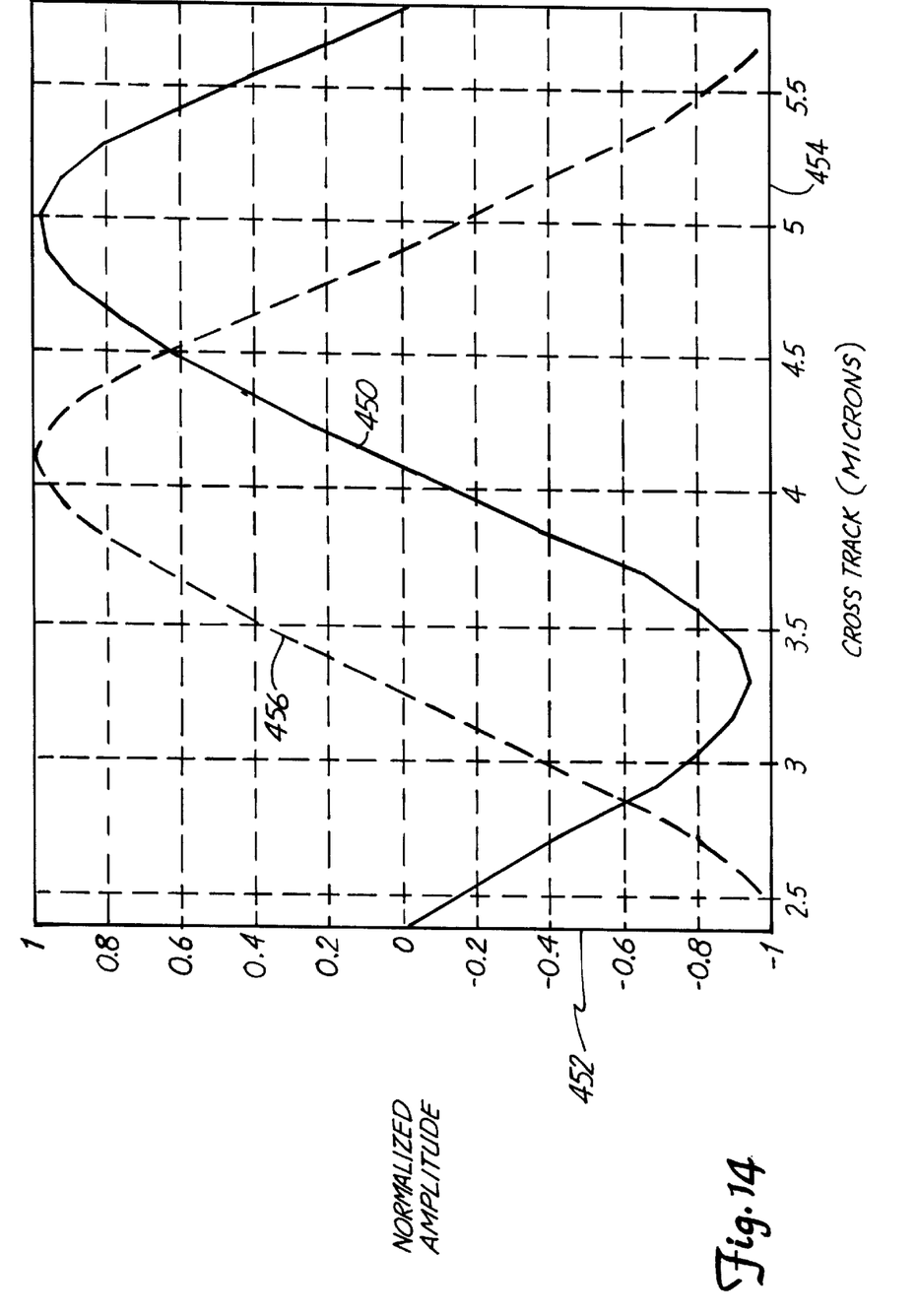
FIG. 14 is a graph relating a position error signal to an actual position.

When the head has been stepped across the entire track, the table contains enough values to determine the position of the head for any possible position error signal. FIG. 14 provides a graph 450 based on such a table that relates normal position error signal values, shown on vertical axis 452, to actual positions, shown on horizontal axis 454. FIG. 14 also shows a graph 456 that relates quadrature position error signal values to cross track positions.

In nearly all embodiments, the step size for creating the table is chosen so that there is adequate resolution of the position error signal. In addition, in one embodiment, the servo burst regions are sampled over a radial distance that is larger than the expected range of motion of the head. This will ensure that the table contains values for all possible positions of the head.

Once the look-up table is complete, the servo control loop for controlling the position of the head can be closed. This is shown as step 406 in FIG. 13. Once the servo loop is closed, head testing can be performed at step 408 by using a closed-loop servo system that uses the suspension's microactuators to perform track following operations.

Figure 15:
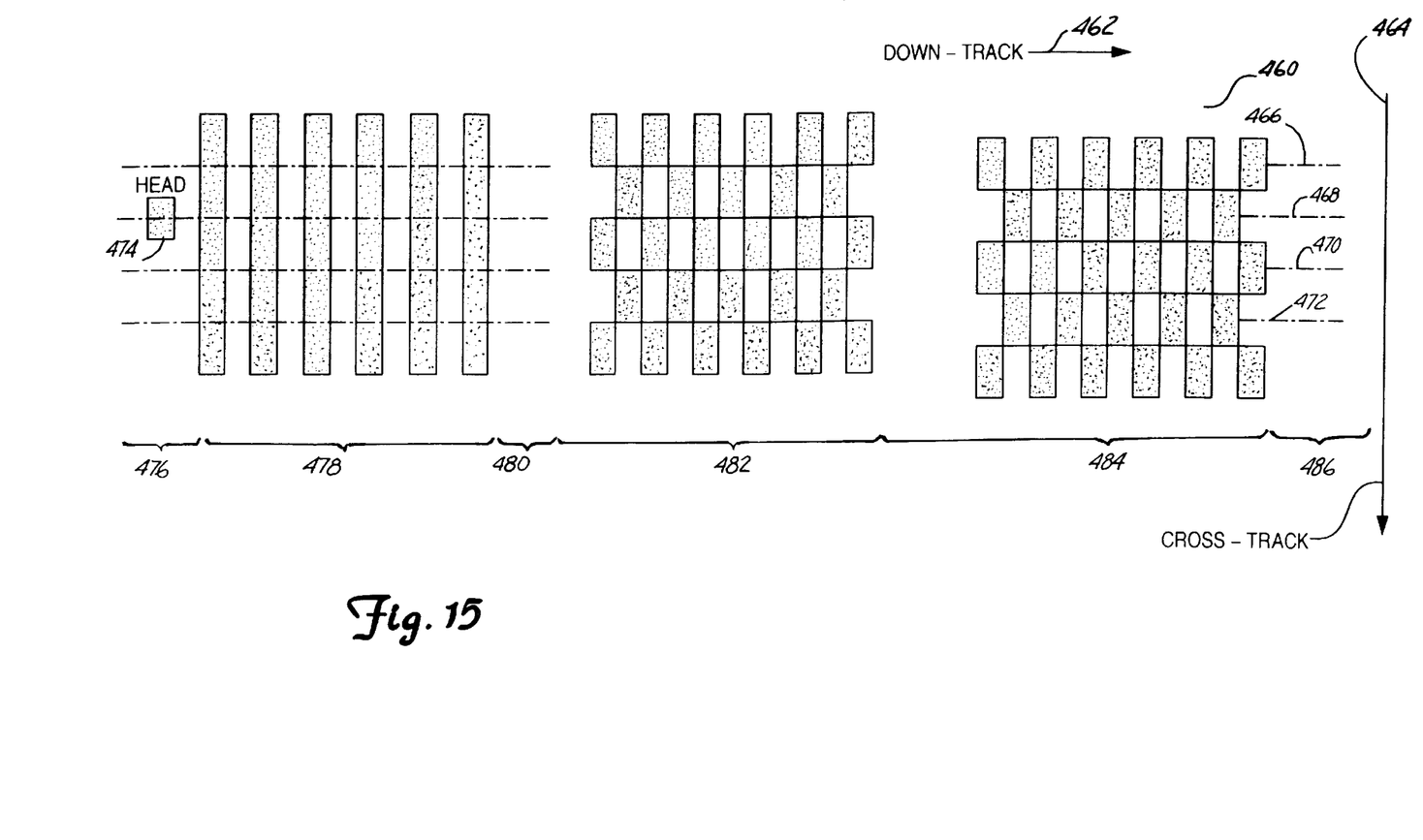
FIG. 15 is a diagram of a servo region under an alternative embodiment of the present invention.

In other embodiments of the invention, a null-type servo pattern is used instead of the split-burst servo patterns of FIGS. 11 and 12. An example of a null-type servo pattern that may be used in the present invention is shown as pattern 460 of FIG. 15. In FIG. 15, the radial dimension of the disc is shown vertically, and the angular dimension of the disc is shown horizontally, with arrow 462 indicating the down-track direction and arrow 464 indicating a cross-track or radial direction. There are four track centers 466, 468, 470, and 472 with head 474 being aligned with track center 468.

The shaded regions in FIG. 15 correspond to regions of opposite magnetic polarity as compared to the non-shaded regions. For example, in a longitudinal recording system, if the longitudinal magnetization in the non-shaded regions were right-to-left in the figure, then the longitudinal magnetization in the shaded regions would be left-to-right. Within these regions, the magnetic medium is saturated in either longitudinal direction, as is standard practice in digital magnetic recording.

Servo sector 460 includes leading field 476, "sync" or "phase" field 478, middle field 480, normal position error field 482, quadrature position error field 484 and trailing field 486. Leading field 476, middle fields 480 and trailing field 486 may be "empty" as shown in FIG. 15 or may include additional servo data. For example, in many embodiments, leading field 476 includes an index mark. Phase field 478 contains radially coherent magnetic transitions. As head 474 passes over phase field 478, the magnetization pattern within phase field 478 induces an oscillating signal in the output of head 474. Normal position error field 482 and quadrature position error field 484 contain null-type magnetic patterns. The quadrature magnetic pattern of quadrature position error field 484 is offset by one-half of a track width with respect to the normal magnetic pattern of normal position error field 482. In some null-type servo patterns, the quadrature magnetic pattern is split in half by placing half of the quadrature pattern before the normal pattern and half of the quadrature pattern after the normal pattern.

Phase field 478 and the position error fields are typically written with reference to a separate clock track. In most embodiments, the clock track is written by a separate clock head that is typically supported on a separate stage from the read head under test. In some embodiments, the clock track is not written on the same disc surface as the phase field and the position error fields but instead is written on a different surface on the same disc or on a separate disc. In systems that use a separate disc, both discs share a common spindle.

Figure 16:
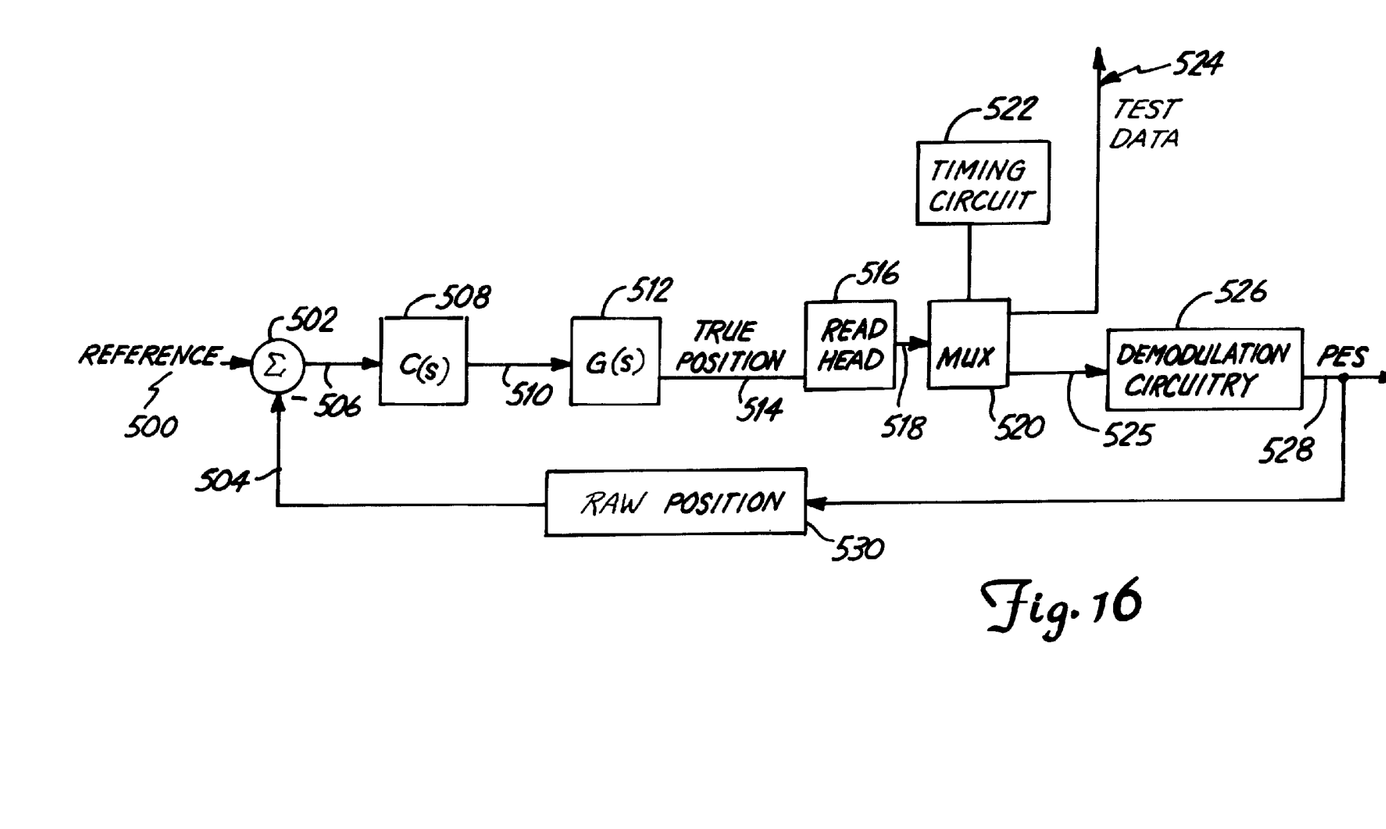
FIG. 16 is a block diagram of a closed loop servomechanism under an embodiment of the present invention.

FIG. 16 provides a block diagram of one embodiment of a closed-loop servo system of the present invention. In FIG. 16, a reference signal 500 is provided to a feedback summing node 502. In one embodiment, reference signal 500 is generated by test box 148 and represents the desired radial track location for the read head. Summing node 502 subtracts a feedback signal 504 from reference signal 500 as described further below. Thus, the output of summing node 502 carries an adjusted reference signal 506, which is the final position error signal.

Adjusted reference signal 506 is provided to a microactuator controller 508, which converts the adjusted reference signal into microcontroller control signals 510. Control signal 510 is provided to the one or more microactuators on the suspension assembly, which are represented collectively as microactuator positioning system G(s) 512. In response to the control signal, microactuator positioning system 512 changes the position of the read head providing a true position 514.

At true position 514, read head 516 reads data and servo information from the track to produce a read signal 518. Read signal 518 is provided to a multiplexer 520, which is controlled by a timing circuit 522 so that portions of read signal 518 that contain test data are routed to a test box through test data line 524 and portions of read signal 518 that contain servo data 525 are routed to demodulation circuitry 526. In one embodiment, timing circuit 522 produces servo gating signal 250 and read/write gating signal 252 of FIGS. 9 and 10 to control multiplexer 520.

As described above, demodulation circuitry 526 demodulates the servo read information into one or more raw position signals 528. The raw position signals are then used to determine an accurate position using a raw position signal to position look-up table 530. A signal representing the actual position of the head is produced from table 530 and is provided as feedback signal 504 to summing node 502. Through this feedback loop, the microactuators on the suspension assembly will continue to move the read head until the read head reaches a position such that the position signal from table 530 matches the reference position signal 500 provided by the test box. In this manner, a read head on the test stand can be set to follow any desired position within a track on the spin-stand disc. This track following is an improvement over the prior art because the track following is based directly on the track actually written to the disc and therefore implicitly accounts for wobble of the track relative to the disc and the fixed elements of the spin-stand.

In summary, the present invention provides a method of testing a head in a spin-stand 100 before the head is placed in a disc drive. The method includes positioning a head 151 at a radial position on a disc 106 and reading test data 524 and servo data 525 from the track. The servo data 525 is then used to position the head 151 at a desired location within the track.

In one embodiment, the head 151 is secured to a suspension assembly 144 that is clamped into a clamping portion 142 of the spin-stand 100. In such embodiments, the step of positioning the read head over a radial position on a disc involves moving the clamping portion 142 so that the head 151 is positioned over the desired track. In other embodiments of the invention, the method also includes writing a first set of servo bursts 306 and a second set of servo bursts 312 at selected circumferential locations around the disc, the second set of servo bursts 312 being radially offset from the first set of servo bursts 306.

Under some embodiments, each servo burst is circumferentially bounded by two respective tolerance areas 324, 320, 322, 326 where each tolerance area lacks any transitions. In such embodiments, the step of reading servo data comprises generating a timing signal 250 that extends for a time equal to the time needed for the read head 151 to pass over a servo burst 306 and two tolerance areas 324 and 320 that bound the servo burst.

The present invention is also directed toward an apparatus for testing a head outside of a disc drive. The apparatus includes a disc 106 capable of spinning and a positioning system 508, 512 capable of establishing a position for the head 516 relative to the disc 106. A servo circuit 526, 530 in the apparatus is capable of converting a servo signal 525 generated by head 516 into a position value 504 representing the position of the head 516 relative to a track on a disc 106. A feedback circuit 502 is capable of controlling the positioning system 508, 512 based on the position value 504 in order to place the head 516 at a desired position relative to the track.

In further embodiments of the invention, a position measuring system 148, 130 is capable of generating physical position values that represent a physical position of a head 151 on a track. A controller 148, 130 is capable of moving the head to a plurality of positions relative to a track on the disc 106 by controlling a positioning system 140. A table formatting module 148, 130 is capable of generating a position table 530 based on the physical position values from the position measuring system and position error signals from the demodulation circuitry 526 that are generated for a plurality of head positions.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, a null-type servo pattern may be used without departing from the scope and spirit of the present invention. Other modifications can also be made.

What is claimed is:

1. A method of testing a head to be used in a disc drive, the method performed in a spin-stand and comprising steps of:
   (a) positioning a read head over a radial position on a disc;
   (b) reading test data from a track at the radial position;
   (c) reading servo data from the track; and
   (d) using the servo data to position the head at a desired location within the track.

2. The method of claim 1 wherein positioning step (a) comprises:
   (a)(1) clamping a suspension assembly containing the head into a clamping portion of the spin stand; and
   (a)(2) moving the clamping portion so that the head is positioned over the track.

3. The method of claim 2 wherein the suspension assembly comprises at least one microactuator and using step (d) comprises:
   (d)(1) activating at least one microactuator on the suspension assembly so that the head moves.

4. The method of claim 1 further comprising a step after positioning step (a) and before reading step (b) of:
   (e) writing servo information to the disc.

5. The method of claim 4 wherein writing step (e) comprises:
   (e)(1) writing a first set of servo bursts at selected circumferential locations around the disc; and
   (e)(2) writing a second set of servo bursts at second selected circumferential locations around the disc, the second set of servo bursts radially offset from the first set of servo bursts.

6. The method of claim 5 wherein each servo burst is circumferentialy bounded by two respective tolerance areas, each tolerance area lacking any transitions and having a substantial down-track length.

7. The method of claim 6 wherein reading step (c) comprises:
   (c)(1) generating a timing signal having a read pulse that extends for a time equal to the time needed for the read head to pass over a servo burst and the two tolerance areas that bound the servo burst; and
   (c)(2) reading from the disc during the read pulse.

8. The method of claim 4 further comprising an additional step after writing step (e) of:
   (f) stepping a read head through a plurality of radial positions;
   (g) creating at least one position error signal at each radial position; and
   (h) generating a position table that relates the position error signal to the actual radial position of the read head.

9. The method of claim 8 wherein using step (d) comprises:
   (d)(1) determining a position error signal from the servo data;
   (d)(2) translating the position error signal into a radial position based on the position table; and
   (d)(3) adjusting the position of the head based on the radial position and the desired location for the head.

10. An apparatus for testing a head outside of a disc drive, the head being mounted on a suspension assembly, the apparatus comprising:
    a disc capable of spinning;
    a positioning system capable of establishing a position for the head relative to the disc;
    a servo circuit capable of converting a servo signal generated by the head into a position value representing the position of the head relative to a track on the disc; and
    a feedback circuit capable of controlling the positioning system based on the position value in order to place the head at a desired position relative to the track.

11. The apparatus of claim 10 wherein the positioning system comprises at least one microactuator built on the suspension assembly.

12. The apparatus of claim 11 wherein the feedback circuit controls at least one of the microactuators on the suspension assembly.

13. The apparatus of claim 10 wherein the servo circuit comprises demodulation circuitry capable of demodulating at least two servo burst signals in the servo signal to generate a position error signal.

14. The apparatus of claim 13 wherein the demodulation circuitry utilizes timing signals having timing windows that indicate when to demodulate each servo burst signal, the timing windows being longer than a single servo burst signal.

15. The apparatus of claim 13 further comprising a position error signal converter capable of utilizing a position table to convert a position error signal into a radial position over the disc, the table associating position error signals to radial positions on the disc.

16. The apparatus of claim 15 further comprising:
    a position measuring systems capable of generating physical position values that represent the physical position of a head over a track;
    a controller capable of moving the head to a plurality of positions relative to a track on the disc by controlling the positioning system; and
    a table formatting module capable of generating the position table based on physical position values from the position measuring system and position error signals from the demodulating circuitry that are generated for a plurality of head positions.

17. The apparatus of claim 10 wherein the feedback circuit is capable of activating multiple microactuators on the suspension assembly.

18. The apparatus of claim 10 further comprising testing circuitry capable of providing testing data to be written to the disc, the testing data selected so that servo areas may be interspersed between the written test data without impacting test results based on the written test data.

19. An apparatus for testing a head outside of a disc drive, the apparatus comprising:
    a positioning system coupled to a suspension assembly that contains the head;
    track following means coupled to the head and the positioning system for controlling the positioning system in order to change the position of the head over a disc.

* * * * *